United States Patent
Rayment et al.

(10) Patent No.: US 7,545,782 B2
(45) Date of Patent: Jun. 9, 2009

(54) MOBILE STATION TRAFFIC ROUTING

(75) Inventors: Stephen G. Rayment, Ottawa (CA); Biswajit Nandy, Kanata (CA); Tricci Yuk-Ying So, Kanata (CA)

(73) Assignee: BelAir Networks, Inc., Kanata, Ontario ( * ) Notice: Subject to any disclaimer, the term of this patent is extended or adjusted under 35 U.S.C. 154(b) by 689 days.

(21) Appl. No.: 10/782,196

(22) Filed: Feb. 19, 2004

(65) Prior Publication Data

US 2005/0185606 A1 Aug. 25, 2005

(51) Int. Cl.
*H04Q 7/24* (2006.01)
*H04L 12/28* (2006.01)
*H04L 12/56* (2006.01)
*H04W 4/00* (2009.01)

(52) U.S. Cl. .................... 370/338; 370/401; 455/422.1; 455/432.1; 455/433

(58) Field of Classification Search .................. 370/328, 370/331, 338, 400–402; 455/422.1, 432.1, 455/433
See application file for complete search history.

(56) References Cited

U.S. PATENT DOCUMENTS

| | | | |
|---|---|---|---|
| 6,487,406 B1 | 11/2002 | Chang et al. | |
| 6,625,135 B1 * | 9/2003 | Johnson et al. | 370/332 |
| 6,816,912 B1 * | 11/2004 | Borella et al. | 709/238 |
| 6,831,921 B2 | 12/2004 | Higgiins | |
| 7,369,522 B1 * | 5/2008 | Soininen et al. | 370/328 |
| 7,457,289 B2 * | 11/2008 | Wang | 370/392 |
| 7,471,656 B2 * | 12/2008 | Karoubalis et al. | 370/331 |
| 7,471,661 B1 * | 12/2008 | Wang et al. | 370/338 |
| 2001/0012777 A1 * | 8/2001 | Igarashi et al. | 455/435 |
| 2002/0018456 A1 * | 2/2002 | Kakemizu et al. | 370/338 |
| 2002/0039357 A1 | 4/2002 | Lipasti et al. | |
| 2002/0075807 A1 * | 6/2002 | Troxel et al. | 370/238 |
| 2003/0120821 A1 | 6/2003 | Thermond et al. | |
| 2003/0210671 A1 | 11/2003 | Eglin | |
| 2003/0235175 A1 * | 12/2003 | Naghian et al. | 370/338 |
| 2004/0087304 A1 * | 5/2004 | Buddhikot et al. | 455/426.2 |
| 2004/0203752 A1 | 10/2004 | Wojaczynski et al. | |
| 2004/0208187 A1 * | 10/2004 | Mizell et al. | 370/401 |
| 2005/0185606 A1 * | 8/2005 | Rayment et al. | 370/328 |
| 2005/0213545 A1 * | 9/2005 | Choyi et al. | 370/338 |

OTHER PUBLICATIONS

Y-C Chen et al., "Enabling Location-Based Services on Wireless LANs," *Proceedings of the 11th IEEE International Conference on Networks*, Sydney, NSW, Australia, Sep. 2003 and 6 pages.

* cited by examiner

*Primary Examiner*—Seema S Rao
*Assistant Examiner*—Xavier Szewai Wong
(74) *Attorney, Agent, or Firm*—Brinks, Hofer, Gilson & Lione

(57) ABSTRACT

Devices, networks and methods relating to routing gateway traffic in a mesh network for wireless access. A mesh network has multiple nodes in at least one gateway node through which all incoming and outgoing data traffic pass through. The nodes provide wireless access to wireless and user devices, each of which is associated with a node in the mesh network. Each gateway node contains a record detailing which nodes are providing wireless access to which wireless end user device and which nodes are associated with which end user devices. This record of each end user device's location is periodically updated as the gateway node periodically receives data from the nodes which detail the device is being serviced by which node. Any incoming data traffic destined for an end user device is encapsulated and routed to the proper node servicing that end user device.

12 Claims, 5 Drawing Sheets

MOBILE STATION TRAFFIC ROUTING

FIELD OF THE INVENTION

The present invention relates to wireless networks. More particularly, the present invention relates to but is not limited to methods, devices, and systems which allow for seamless roaming of wireless devices in a wireless network.

BACKGROUND TO THE INVENTION

The recent telecommunications revolution has shown consumers the possibilities regarding network access. Among other possibilities, consumers can now connect to their corporate networks or even their home networks from remote locations to access their data. Wireless technology has added to these possibilities by freeing consumers from the need to be physically connected to the network. With wireless technology, it is now possible to have seamless wireless access to a network even while the wireless end user device is moving.

Current technology allows wireless end user devices such as wireless modem equipped notebooks and wireless PDAs to be mobile. However, current methods only allow limited mobility for these devices. Extended mobility is possible but at the cost of connection speed and complexity. Currently, each wireless end user device, when using wireless access from an access node in a network, is associated with that access node. The wireless end user device's IP address is a subset to the IP address of that node. The wireless end user device can move about the area of coverage provided by that access node. If the wireless end user device strays away from the coverage of its associated or home node, it will be provided wireless coverage by another access node. To provide continuous seamless coverage, the wireless end user device retains its IP address even though it is no longer within the coverage of its home node.

To allow for the immutable nature of the wireless end user device's IP address, any data traffic bound for that end user device is currently routed to the device's home or associated node. Then, the data traffic is rerouted from the home node to the node providing coverage to the end user device.

While such a scheme as above currently provides seamless coverage, its performance is less than desirable. Data traffic must, under the above scheme, traverse multiple hops before finally arriving at the destination device. All data traffic destined for a roaming end user device, regardless of its origin, must be re-routed to that device's home node. Only after the traffic has reached the home node can it be re-routed to the device at another node. If this other node is multiple hops away from the home node, the above scheme introduces more latency between data packets as the data traffic must traverse multiple hops. As such, the further the home node is from the node providing wireless access to the roaming wireless end user device, the greater the amount of delay before data traffic arrives at the device.

The above drawback can become significant as picocell (or very small area coverage) technology is used. As an example, an end user using a wireless PDA in a large building may, if picocells are used, traverse the areas of coverage of multiple nodes in that single building. The farther the device is from its home node, the more degraded becomes the data rate as the latency increases. Thus, a person who has a device with a home node in the first floor may have much slower response times when using the device on the twentieth floor. Faster service can be obtained by switching home nodes but this usually involves replacing the device's IP address. Such a move would require that any network transactions or sessions for the device be terminated and reconnected using the new IP address.

Based on the above, there is a need for routing methods or devices which will allow the same seamless wireless access currently available but which will lower the latency between data packets even if a wireless end user device's home node is far from the node providing wireless access.

SUMMARY OF THE INVENTION

The present invention provides devices, networks and methods relating to routing gateway traffic in a mesh network for wireless access. A mesh network has multiple nodes and may have at least one gateway node through which all incoming and outgoing data traffic pass through. The nodes provide wireless access to wireless end user devices, each of which is associated with a node in the mesh network. Each gateway node contains a record detailing which nodes are providing wireless access to which wireless end user device and which nodes are associated with which end user devices. This record of each end user device's location is periodically updated as the gateway node periodically receives data from the nodes which detail which device is being serviced by which node. Any incoming data traffic destined for an end user device is encapsulated and routed to the proper node servicing that end user device. If the end user device does not move from its node, encapsulation is not required.

In a first aspect the present invention provides in a mesh network of a plurality of nodes providing wireless network access to at least one wireless end user device, a gateway node for providing wireless end user device tracking and data traffic services to said mesh network, the gateway node comprising:

a gateway communications module for receiving data traffic from another network external to said mesh network and for relaying data traffic to said another network;

at least one backhaul communications module for sending and receiving data traffic to and from said mesh network;

a control module for controlling and routing data traffic between said mesh network and said another network;

a location table for recording a location of the or each wireless end use device, said location being determined by which node provides wireless coverage to said wireless end user device, said location being denoted by an address of said node providing coverage;

an association table for recording which node the or each wireless end user device is associated with, each wireless end user device being associated with only one node at any one time, wherein said control module routes said data traffic from said another network to the or each wireless end user device based on entries in said location table and said association table.

In a second aspect the present invention provides a mesh network for providing wireless access to a plurality of roaming wireless end user devices said mesh network comprising:

at least one gateway node for relaying data traffic between another network external to said mesh network and said mesh network;

a plurality of nodes interconnected in a mesh configuration, each node being in communication with at least one node being in communication with said at least one gateway node;

at least one of said plurality of nodes being in wireless communication with at least one of said wireless end user devices wireless access, wherein each of said wireless end user devices is associated with a single node;

the or each of said at least one gateway node has a record of a location of each of said wireless end user devices in said mesh network, said location of each wireless end user device being denoted by an address of a node providing wireless access to said wireless end user device;

the or each of said at least one gateway node routes data traffic destined for a roaming wireless end user device to a node providing wireless access to said roaming wireless end user device based on said record of said location of said roaming wireless end user device, said roaming wireless end user device being a wireless end user device being provided wireless access by a node other than a node associated with said roaming wireless end user device.

In a third aspect the present invention provides a method of routing data traffic destined for a roaming wireless end user device in a mesh network having a plurality of nodes providing wireless access to a plurality of wireless end user devices, said mesh network having at least one gateway node for providing data traffic services, each of said wireless end user devices being associated with one of said nodes and said roaming wireless end user device being a wireless end user device being provided wireless access by a node said wireless end user device is not associated with, the method comprising:

a) receiving data traffic destined for a roaming wireless end user device at a gateway node;

b) checking a record in said gateway node for a location of said roaming wireless end user device, said location being an indication of which node in said network is providing wireless access to said roaming wireless end user device;

c) repackaging said data traffic for routing to said roaming wireless end user device such that repackaged data traffic is now destined for a node providing wireless access to said roaming wireless end user device; and d) sending said repackaged data traffic to said node providing wireless access to said roaming wireless end user device.

In a fourth aspect the present invention provides a method of routing data traffic destined for a roaming wireless end user device in a mesh network having a plurality of nodes providing wireless access to a plurality of wireless end user devices, said mesh network having at least one gateway node for providing data traffic services, each of said wireless end user devices being associated with one of said nodes and said roaming wireless end user device being a wireless end user device being provided wireless access by a node said wireless end user device is not associated with, the method comprising:

a) receiving data traffic destined for a roaming wireless end user device at an associated node associated with said roaming wireless end user device, said data traffic originating from a wireless end user device;

b) determining a location of said roaming wireless end user device based on data received by said associated node from a gateway node;

c) repackaging said data traffic into a data package destined for a node denoted by said location;

d) sending said data package to said node denoted by said location.

In a fifth aspect the present invention provides a method of routing data traffic destined for a roaming wireless end user device in a mesh network having a plurality of nodes providing wireless access to a plurality of wireless end user devices, said mesh network having at least one gateway node for providing data traffic services, each of said wireless end user devices being associated with one of said nodes and said roaming wireless end user device being a wireless end user device being provided wireless access by a node said wireless end user device is not associated with, the method comprising:

a) receiving a data package addressed to a destination node providing wireless access to a roaming wireless end user device at said destination node;

b) unpackaging said data package and transmitting said contents to said roaming wireless end user device;

c) in the event said data package is from a node associated with said roaming wireless end user device, receiving subsequent data packages from a gateway node, said data packages containing data traffic destined for said roaming wireless end user device; and d) in the event said data package is from a source node which is not associated with said roaming wireless end user device, establishing a connection between said source node and said destination node for subsequent data traffic destined for said roaming wireless end user device.

BRIEF DESCRIPTION OF THE DRAWINGS

A better understanding of the invention will be obtained by considering the detailed description below, with reference to the following drawings in which.

DETAILED DESCRIPTION

Figure 1:
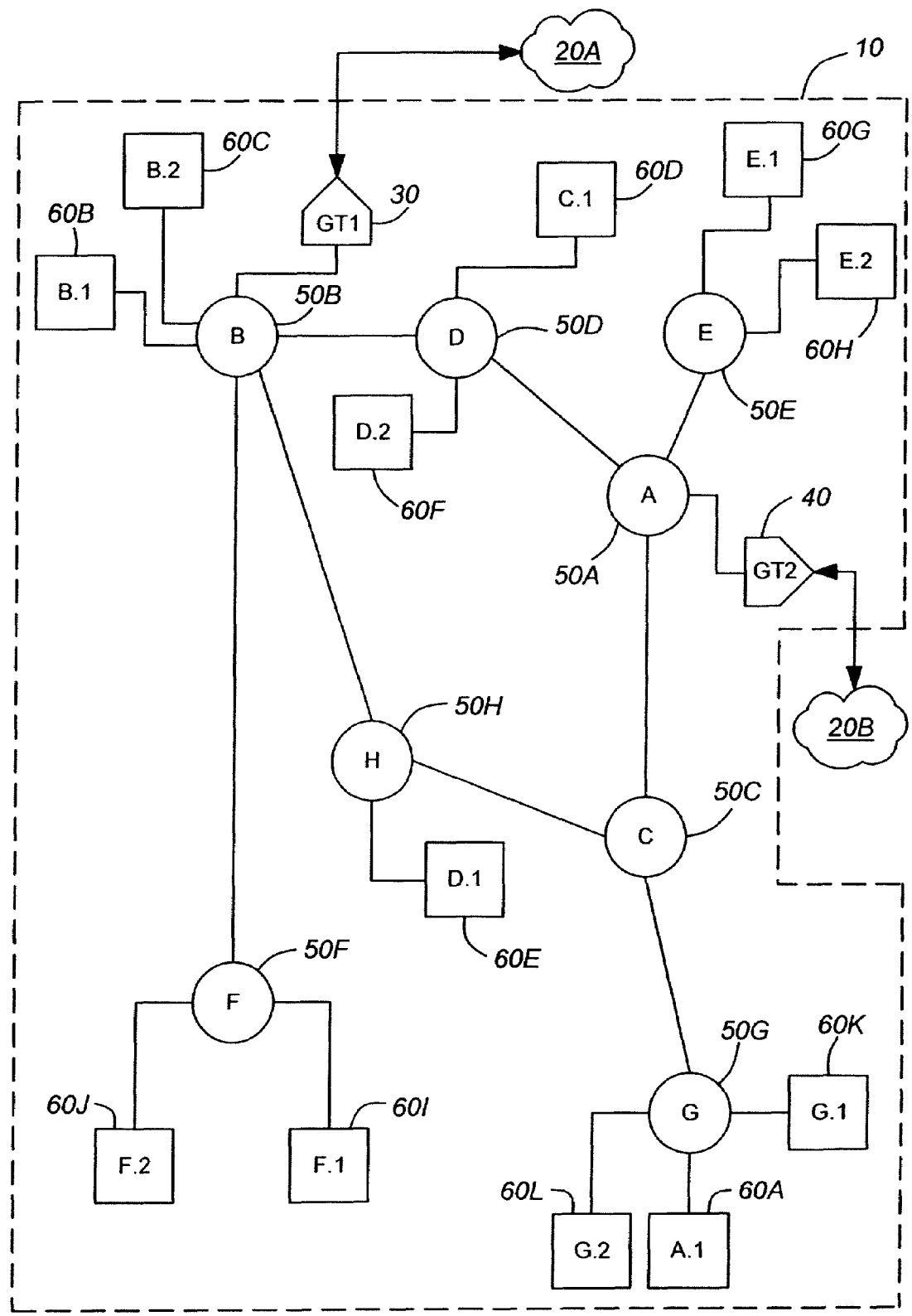
FIG. 1 is a block diagram of a mesh network according to one aspect of the invention.

FIG. 1 is a mesh network 10 for providing wireless access to wireless end user devices. Adjacent to the mesh network 10 are external networks 20A, 20B external to the network 10. The mesh network 10 has two gateway nodes 30, 40 denoted as nodes GT1 and GT2. Nodes 50A-50H, denoted as nodes A-H, are interconnected with each other and with the gateway nodes GT1 and GT2. For simplicity, the interconnections between the nodes are detailed below.

| Node | Connections |
|------|-------------|
| A | E, D, C, GT2 |
| B | D, F, H, GT1 |
| C | A, G, H |
| D | A, B |
| E | A |
| F | B |
| G | C |
| H | B, C |

The nodes A-H are deployed to provide wireless coverage to the wireless end user devices shown as squares 60a-60L in the Figure. Each of the devices are associated with single node which may be turned as at devices "home" node or "associated" node. This association usually manifests itself in a device's IP address. A device's IP address is usually derived from its home nodes IP address. Each device may roam throughout the network 10 and get provided wireless access by nodes other than its home node without requiring a new IP address. To simplify matters, devices 60A-60L are denoted by their home node and a number. As an example, device 60A is denoted by A.1 meaning its home node is node A and that it is a device (as decoded by the X. number format) and not a node.

The location of the different devices in the mesh network is summarized below. It should be noted that the term "location" denotes the node which is providing wireless access to a specific device.

| Device | Location (Node) |
|--------|-----------------|
| A.1    | G               |
| B.1    | B               |
| B.2    | B               |
| C.1    | D               |
| D.1    | H               |
| D.2    | D               |
| E.1    | E               |
| E.2    | E               |
| F.1    | F               |
| F.2    | F               |
| G.1    | G               |
| G.2    | G               |

As can be seen, multiple devices can be provided wireless access by a single node. Each node provides wireless access to devices in its coverage area. Once a device moves away from the coverage area of a first node to the coverage area of a second node, the first node ceases providing wireless access and the second node assumes this function. Thus, as an example, if device A.1, currently covered by node G, moves towards node H, then, at some point node G will cease to provide coverage and node H takes over.

It should be noted that all incoming and outgoing data traffic to the mesh network 10 pass through either of the gateway nodes GT1, GT2. Any incoming data traffic from either external networks 20A, 20B pass through either of the gateway nodes GT1, GT2 and is routed through the network 10 to its destination. Both gateway nodes may be connected to the same external network or to the Internet.

Figure 2:
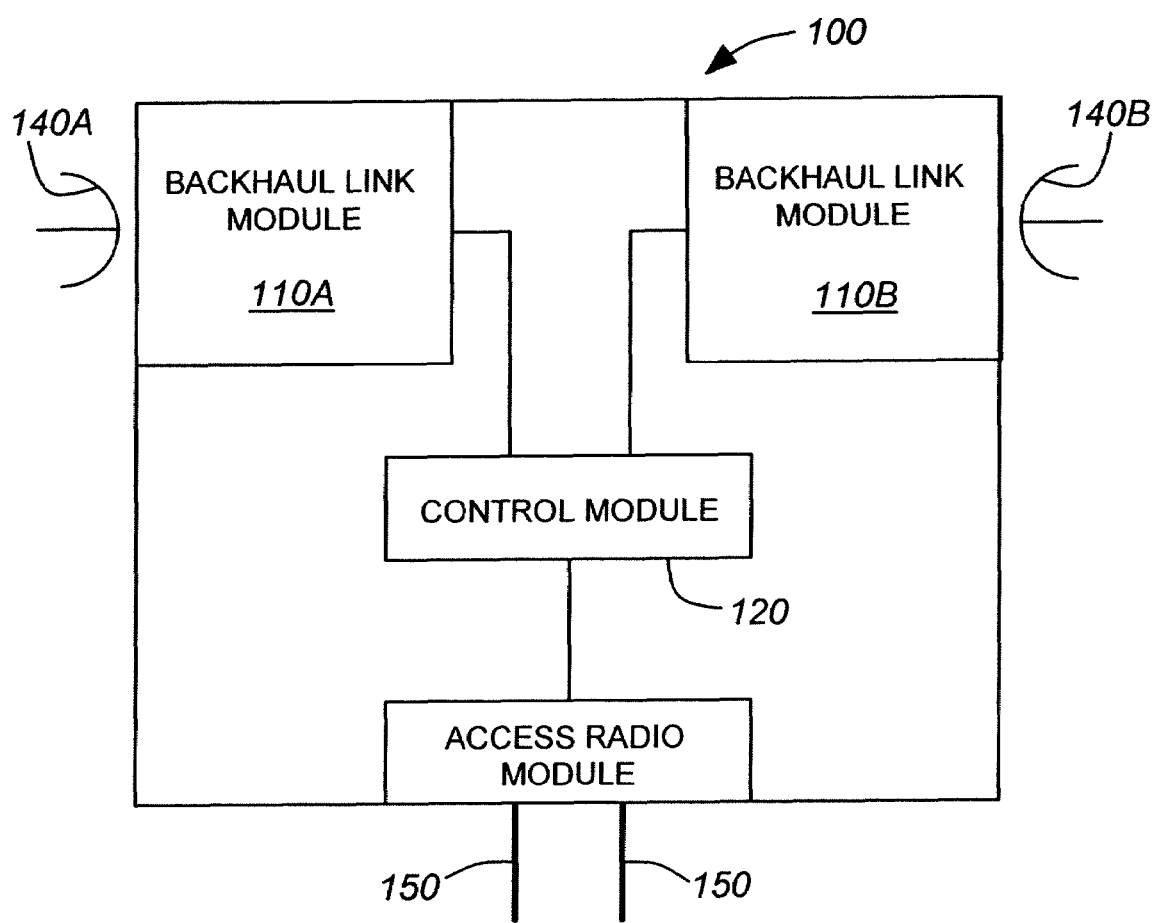
FIG. 2 is a block diagram of a node for use in the mesh network of FIG. 1.

One possible configuration for the nodes is illustrated in the block diagram of FIG. 2. In that figure, the node 100 is equipped with two backhaul link modules 110A, 110B, a control module 120 and a wireless access module 130. The backhaul link modules 110A, 110B are used to communicate between nodes and may use either wired or wireless technology. For wireless technology, one option would be the use of dedicated point to point links between nodes using directional wireless antennas 140A, 140B. The data traffic received or sent through the backhaul modules 110A, 110B pass through the control module 120. The control module 120 determines if processing is required and how the data traffic is to be handled. The data traffic may be relayed to another node or it may be passed onto the access module 130 for distribution to the wireless end user devices being serviced by the node 100. The control module 120 may examine the incoming data traffic and, based on the addressing information, route the data traffic accordingly. The access radio 130, as noted above, provides wireless access to the wireless end user device in its area. Signals are received from and sent to these devices through an omnidirectional antenna 150.

Figure 3:
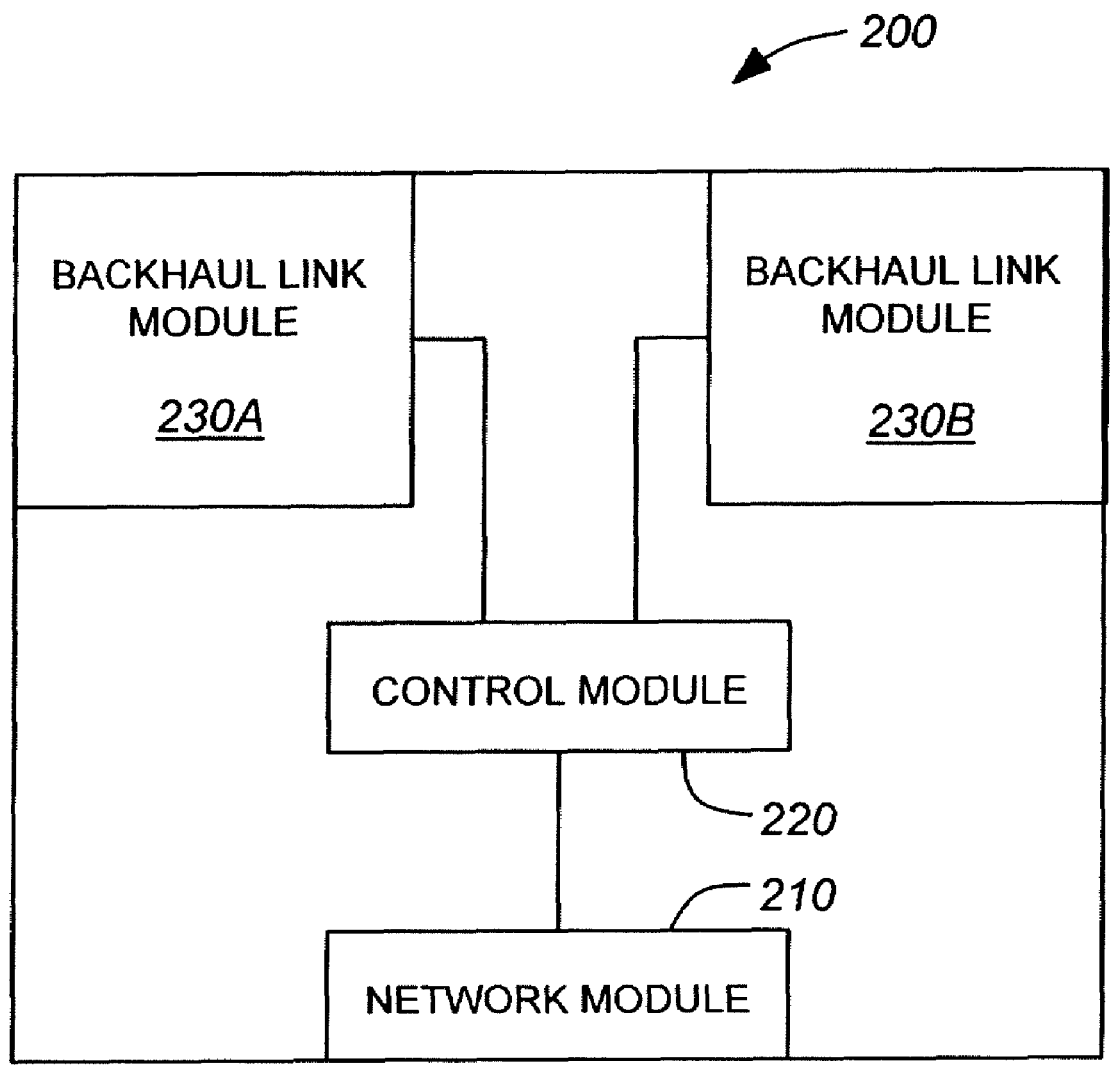
FIG. 3 is a block diagram of a gateway node for use in the mesh network of FIG. 1.

Referring to FIG. 3, a possible configuration of the gateway node 200 is illustrated. The gateway node 200 provides the mesh networks link to the outside world and, as such, it is equipped with a network access module 210 that communicates with an external network. All data traffic to and from the network module 210 passes through a control module 220. This module 220 examines the incoming traffic and, based on the address information and traffic and the contents of tables internal to the control module, routes the data traffic to the mesh network. To do this, backhaul modules 230A, 230B provide links to the nodes in the mesh network. These backhaul modules 230A, 230B may be similar to the backhaul modules 110A, 110B and the node 100 discussed above.

To properly route data traffic to the wireless end user devices 60A-60K, each gateway node 30, 40 is provided with a table or record of which node is providing wireless access to which wireless device. The record, internal to the control module 220 in the gateway nodes GT1, GT2, is compiled by receiving periodic inputs from the nodes themselves. Each node 60A-60K sends data (which may be termed internal network data or data internal to the mesh network) to one of the gateway nodes. For redundancy and to ensure operability but at the cost of some overhead, the data may be sent to both or all gateway nodes. The gateway node receives this internal network data and, based on it, updates its internal record. For redundancy and to ensure consistency, each gateway node sends a copy of its internal record to the other gateway nodes. The recipient gateway nodes then update their internal records so that all gateway nodes have identical internal records. The frequency of the updates may be left to the discretion of the system designer, taking into account the needs of the system. One consequence of the above is that each gateway node always "knows" a wireless device's location or the node which is providing wireless access to that device. Each gateway node is also provided with a record of each wireless device's home or associated node. Whenever a wireless device moves from a coverage of a first node to a second node, the second node notifies a gateway node of that change. The gateway node then notifies the home node of that device of the change as well. The reason for this notification is given below but one of its consequences is that each home or associated node is always "aware" or has a record of the location of the devices associated with it. Thus, each node has a record of which devices are currently receiving wireless access from it and a record of the location of the devices associated with it.

The above scheme allows for seamless routing of data traffic to the relevant wireless device without undue delays. Data traffic incoming from the internal sources and destined for a "roaming" wireless end user device (defined as a wireless end user device that is not being currently provided wireless access by its home node) is examined by the gateway node through which the data traffic transits. The control module in the gateway node checks the destination address in the data traffic (e.g. A.1 for device 60A) and notes that, according to the record, that device is roaming. Also, the control module makes note that the data traffic will need to be re-routed since, normally, the incoming traffic will only need to be sent to the home node of the destination device, i.e. node A. To properly re-route the data traffic while allowing the destination device to retain its original IP address, the gateway encapsulates or repackages the data traffic. The original data traffic, including its destination and source addresses, is not altered in any way but is merely repackaged as a completely new data package with a new addressing "wrapper". As an analogy, this is akin to the gateway placing the data traffic in a new envelope with a new address to denote a new address to the node providing wireless access to the destination device. This repackaged data traffic will have a destination address of the node servicing the destination device and will be flagged as repackaged data traffic.

Once the repackaged data traffic is received by the destination node (the node providing access to the destination device and not the home node of the destination device), the destination node notes that it is repackaged data traffic. As such, the destination node removes the original data traffic from the repackaging and sends that original data traffic to the destination device. In the event data traffic arrives at a node from which a roaming device is leaving, that data traffic may be lost at the node being vacated. To prevent this, the new location of a roaming device may be communicated to the home node of the roaming device and to the node which last provided coverage to the roaming device. This should also prevent transient packet loss.

The above scheme also allows for a faster internal routing of data traffic between roaming devices. A first roaming device's traffic sent to a second device in the same mesh network is initially routed to the home node of the second device. If the second device is roaming as well (i.e. it is not covered by its home node), the data traffic is repackaged by the home node and rerouted to the node servicing the second device (the destination node). This repackaged data traffic will have the source address of the node servicing the first device. The node servicing the second device receives the repackaged data traffic and redirects the contents of the repackaged data traffic to the second device. This destination node then notes that the repackaged data traffic is internal and, as such, notes the original source address of the content—the address of the first device. The destination node also notes the source address of the repackaged data traffic—the node servicing the first device. Accordingly, the destination node makes note that any data traffic addressed to the first device must be intercepted and repackaged with a new destination address so that the repackaged data traffic is rerouted to the node servicing that first device. Similarly, when the node servicing the first device receives repackaged data traffic from the second device (with the repackaged data traffic having a source address equal to the address of the designation node), this node notes that any data traffic destined for the first device must be intercepted. This data traffic must be intercepted, repackaged, and rerouted to the destination node. Effectively, the two nodes in question, the destination node and the node servicing the first device, must intercept and repackage data traffic destined for the other roaming device.

To clarify the above, we can take as an example data traffic between device C.1 being serviced by node D and device A.1 being serviced by node G. Device A.1 sends data traffic to node C with the following header information:

| Source | A.1 |
|--------|-----|
| Destination | C.1 |

This data traffic is re-routed to node C since it is the home address of device C.1 and the destination address includes the prefix C.

Upon the data traffic reaching node C, node C notes that the device C.1 is being serviced by node D. As such, node C repackages or encapsulates the data traffic from device A.1 into new data traffic with the following header information:

| Source | G |
|--------|---|
| Destination | D |

As noted above, the encapsulation/repackaging does not affect the original header information from device A-1.

Node D, once it receives the repackaged data traffic, notes that it is internal traffic or that it originated internally. Node D then decapsulates or removes the repackaging after noting its source and destination addresses. Once node D notices that the original data traffic's source is device A.1 but that the source address of the repackaged data traffic is node G, then node D programs itself to intercept any outgoing data traffic designated for device A.1. If device C.1 sends data traffic back to device A.1 with the following header information:

| Source | C.1 |
|--------|-----|
| Destination | A.1 | then node D intercepts that data traffic and repackages it with the following header information:

| Source | D |
|--------|---|
| Destination | G. |

Node G, when it receives a repackaged data traffic from node D, performs the same operation as node D and reprograms itself after inspecting the contents and the headers of the repackaged data traffic. Node G programs itself to intercept any data traffic destined for device C.1 and repackages it with the following header information:

| Source | G |
|--------|---|
| Destination | D |

From the above it should be clear that, after initial set up data traffic, the home node of either device is not involved in the routing of the data traffic. If a roaming device moves again (e.g. C.1) to another node (e.g. node E), then the other roaming device (e.g. device A.1) will not know of the new node providing coverage. This can be addressed if the gateway nodes are always informed of the change of nodes providing coverage to the roaming devices.

Figure 4:
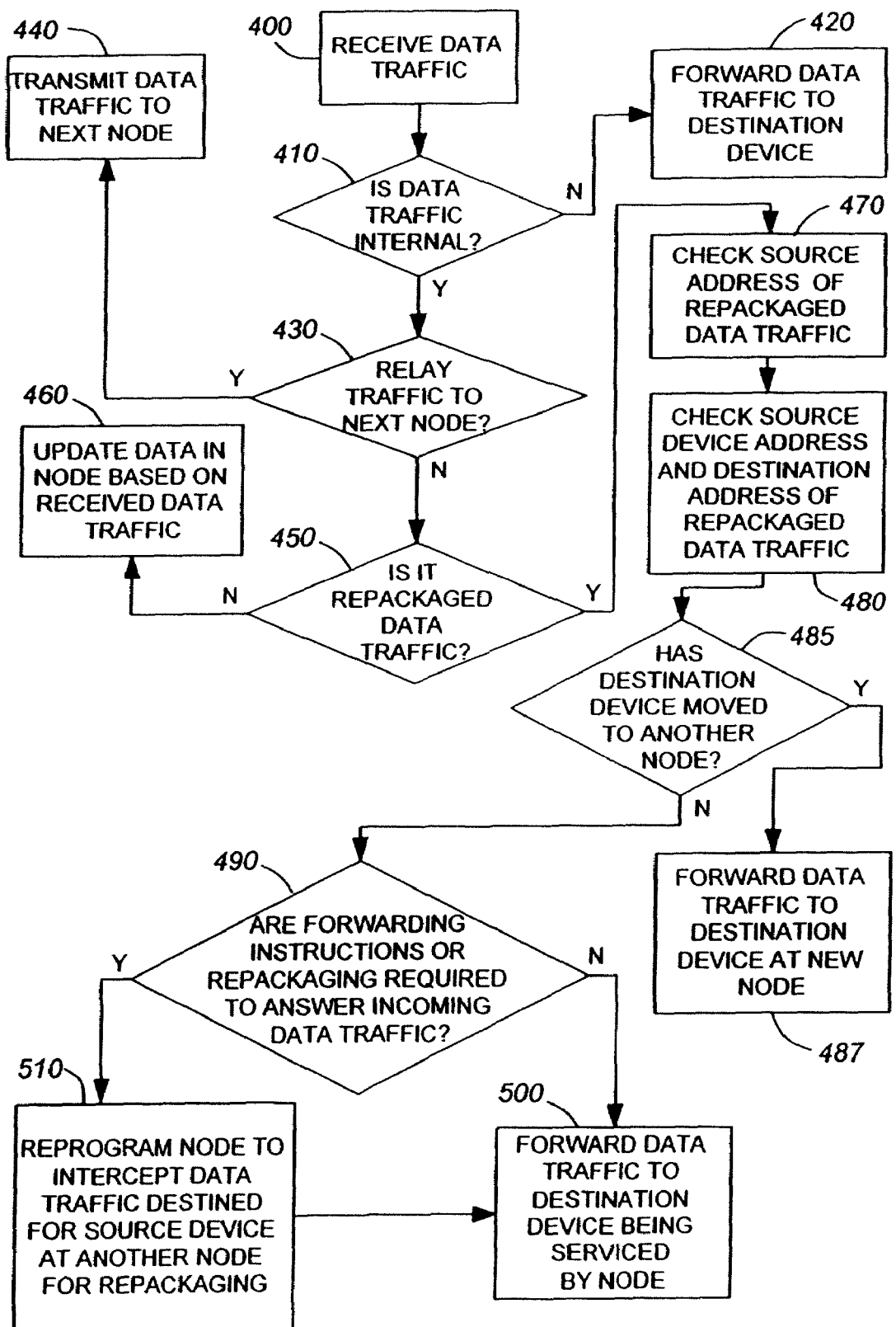
FIG. 4 is a flowchart detailing the steps in a method executed by the nodes in the mesh network of FIG. 1.

The steps taken by a node when it receives data traffic can be summarized by the flowchart illustrated in FIG. 4. As can be seen in FIG. 4, the process begins with the mesh network node receiving data traffic in step 400. Step 410 decides if the traffic is internal or not. If the traffic is not internal to the mesh network, the data traffic is forwarded to the destination device in step 420. It should be noted that the term "internal" in this case means that the data traffic has a source internal to the mesh network.

If the data traffic has a source that is internal to the mesh network, step 430 decides if the data traffic merely needs to be re-routed or relayed to another node. If it merely needs to be relayed to another node, then step 440 of the process is to transmit the data traffic to the next node in the relay. On the other hand, if the data traffic is not to be relayed to another node, then step 450 is to decide whether the received traffic has been repackaged or encapsulated data traffic. If the data traffic received is not repackaged data traffic, then the data traffic must be internal data traffic and is merely reporting data for use by the node. As such, step 460 is that of updating the data in the node based on the received data traffic. This data traffic received may therefore be from one of the gateway nodes notifying the node that one of the wireless end user devices associated with it has moved area coverage from one node to another.

If the data traffic received is repackaged or encapsulated data traffic, then step 470 is that of checking the source address of the repackaged data traffic. This entails determining the source address of the repackaged data traffic to ascertain from which node the data traffic originated. Step 480 requires that the node look into the repackaged data traffic to find the original data traffic and to determine the original source device and the original destination address of that data traffic which has been repackaged. Decision 485 determines if the destination device has moved to another node for coverage. If the destination device has moved, then the data traffic is forwarded to that new node. Otherwise, decision 490 is executed. In decision 490, is done the node has to determine whether any forwarding instructions or repackaging of data traffic is required to respond to the data traffic received. If forwarding instructions or repackaging is not required then step 500 is that of forwarding the data traffic that was repackaged to the destination device being serviced by the node. On the other hand, if forwarding instructions or repackaging is required then the node has to reprogram itself to intercept data traffic destined for the source device based on the address of that source device. Thus, the node must intercept any data traffic destined for that source device and repackage that data traffic so that it will now be destined for the node which currently services that source device. As noted above, the address of the source device was found in step 480 and the address of the node which is servicing that source device was found in step 470. The final step in this process is that of step 520—forwarding the data traffic to the destination device being serviced by the node.

Figure 5:
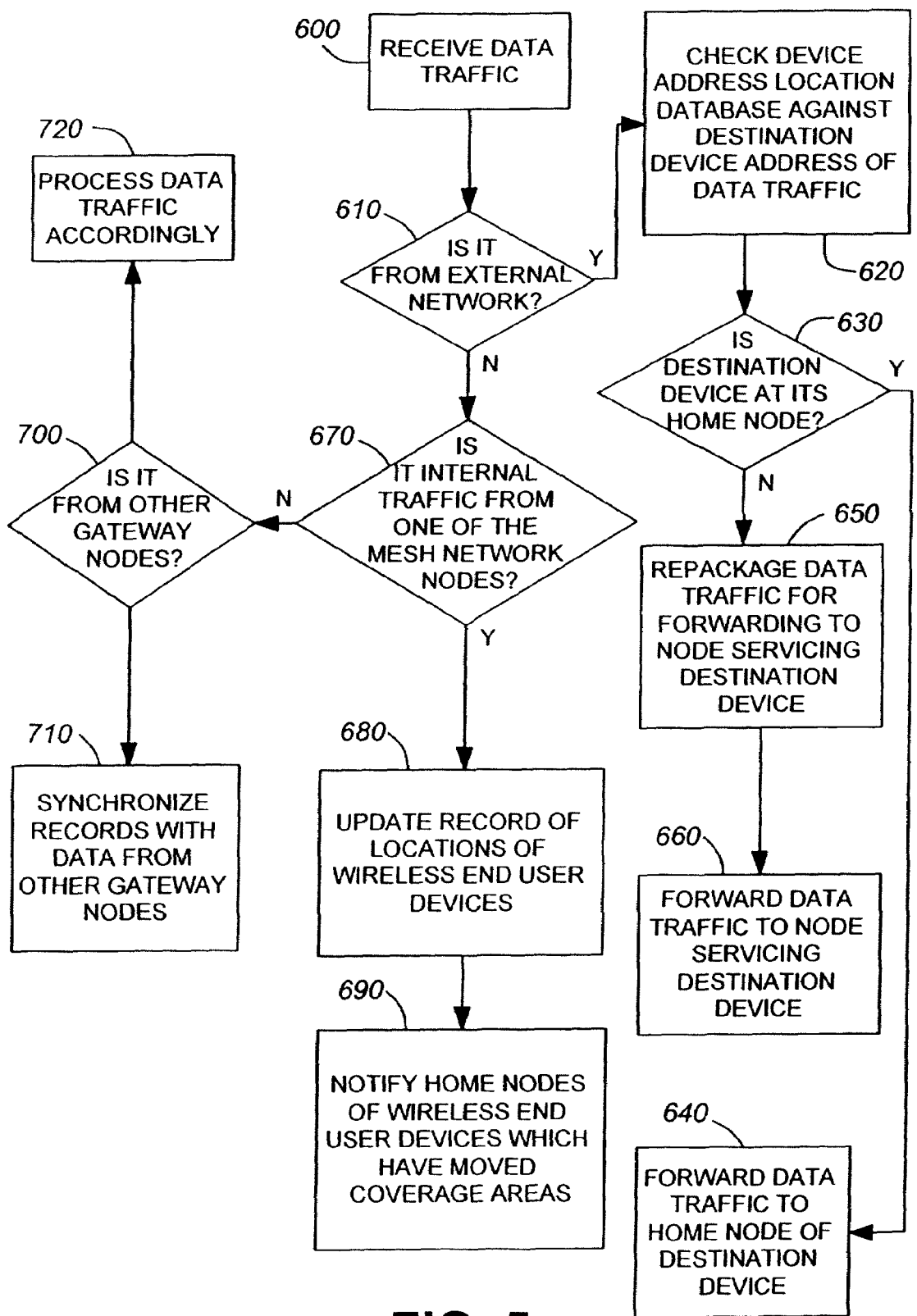
FIG. 5 is a flowchart detailing the steps in a method executed by the gateway nodes in the mesh network of FIG. 1.

Referring to FIG. 5, the figure illustrates the steps in a process executed by a gateway node when it receives data traffic. As can be seen in FIG. 5, the process begins with step 600 that of receiving data traffic. Step 610 is that of deciding whether the data traffic is from the external network and not from within the internal mesh network. If the data traffic is from the external network, step 620 is that of checking the device address database against the destination device address of the data traffic. Step 630 is determining whether the destination device is at its home node based on the determination done in step 620. If the destination device is at its home node, then the data traffic merely has to be forwarded to the home node of the destination device as set out in step 640. If, on the other hand, the destination device is not at is home node, then step 650 is that of repackaging the data traffic for forwarding to the node servicing the destination device. The address for the node servicing the node destination device was found in step 620 as that step determined the location of the destination device. Step 660 is that of forwarding the repackaged data traffic to the node servicing the destination device.

Returning to the decision in step 610, if the received data traffic is not from an external network then the received data traffic must have a source from the internal mesh network. Step 670 is that of determining whether the traffic is from one of the internal mesh network nodes. If so, then step 680 is that of updating the record of locations of wireless end user devices as the internal traffic must be a reporting data message from one of the internal mesh network nodes notifying the gateway node of a change in the location of a wireless end user device. Step 690 is therefore that of notifying the home node of the wireless end user devices which have moved coverage areas.

Returning to step 670, if the internal traffic is not from one of the mesh network nodes, then decision 700 checks to see if the internal traffic is from one of the other gateway nodes. If so, then step 710 is that of synchronizing records with the data from the other gateway nodes. This helps ensure that all the gateway nodes have the same data. If the internal traffic is not from one of the other gateway nodes, then the traffic must have come from one of the wireless end user devices. As such it must be handled differently and this is shown in step 720. This may involve forwarding the data traffic to the external network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. In a mesh network having a plurality of nodes for providing wireless access to a plurality of wireless end user devices including a first device and a second device, the first device being associated with a first home node, the second device being provided wireless access by a second roaming node and being associated with a second home node different from the second roaming node, the second roaming node and the second home node each being different from the first home node, the plurality of nodes including a gateway node for tracking the wireless end user devices and for relaying data traffic between the mesh network and another network external to the mesh network, a method of routing data traffic between the second device and the first device when the first device moves into a coverage area of a first roaming node different from each of the first home node and the second roaming node, the method comprising:
- receiving only at the gateway node a notification from the first roaming node that the first device has moved into the coverage area of the first roaming node;
- receiving only at the first home node a notification from the gateway node that the first device has moved into the coverage area of the first roaming node;
- receiving the data traffic from the second roaming node at the first home node, the data traffic originating from the second device and being destined for the first device;
- forwarding the data traffic from the first home node to the first roaming node;
- determining at the first roaming node that the data traffic was received from the second roaming node;
- determining that the data traffic originated from the second device and is destined for the first device;
- reprogramming the first roaming node to route any further data traffic destined for the second device to the second roaming node; and
- forwarding the data traffic to the first device wherein further data traffic destined for the second device at the second roaming node from the first roaming node is routed to the second device without involving the second home node or the gateway node.

2. The method according to claim 1 wherein an address of the second device is derived from an address of the second home node.

3. The method according to claim 2 wherein the address of the second device is an IP address of the second device, the address of the second home node is an IP address of the second home node, whereby the IP address of the second device is derived from the IP address of the second home node.

4. The method according to claim 2 wherein routing any further data traffic destined for the second device to the second roaming node comprises associating the further data traffic with an address of the second roaming node which is different from the address of the second home node.

5. The method according to claim 4 wherein associating the further data traffic with the address of the second roaming node comprises repackaging the further data traffic using the address of the second roaming node.

6. The method according to claim 1 wherein any further data traffic destined for the second device which is received by the second roaming node is forwarded by the second roaming node to the second device.

7. The method according to claim 1 wherein determining that the data traffic was received from the second roaming node at the first roaming node comprises determining an association between the data traffic and an address of the second roaming node.

8. The method according to claim 1 wherein determining that the data traffic originated from the second device and is destined for the first device comprises: determining an association between the data traffic and an address of the second device; and determining an association between the data traffic and an address of the first device.

9. A mesh network having a plurality of nodes for providing wireless access to a plurality of wireless end user devices including a first device and a second device, the plurality of nodes including:
- a first roaming node for providing wireless access to the first device when the first device moves into a coverage area of the first roaming node, the providing including receiving data traffic from the first device;
- a gateway node for tracking the wireless end user devices and for relaying data traffic between the mesh network and another network external to the mesh network, the gateway node being further for receiving a notification from the first roaming node that the first device has moved into the coverage area of the first roaming node, the first roaming node being further for sending the notification only to the gateway node;
- a first home node associated with the first device, the first home node being different from the first roaming node, the first home node being for receiving from the gateway node a notification that the first device has moved into the coverage area of the first roaming node, the gateway node being further for sending the notification only to the first home node;
- a second home node associated with the second device; and
- a second roaming node different from the first roaming node and the second home node, the second roaming node being for receiving from the second device data traffic destined for the first device, and for forwarding the data traffic to the first home node, the first home node being further for forwarding the data traffic to the first roaming node, the first roaming node being further for:
  - determining that the data traffic was received from the second roaming node;
  - determining that the data traffic originated from the second device and is destined for the first device;
  - reprogramming the first roaming node to route further data traffic destined for the second device to the second roaming node; and
  - forwarding the data traffic to the first device wherein any further data traffic destined for the second device at the second roaming node from the first roaming node is routed to the second device without involving the second home node or the gateway node.

10. The mesh network according to claim 9 wherein an address of the second device is derived from an address of the second home node.

11. The mesh network according to claim 10 wherein routing any further data traffic destined for the second device to the second roaming node comprises associating the further data traffic with an address of the second roaming node which is different from the address of the second home node.

12. The mesh network according to claim 11 wherein associating the further data traffic with the address of the second roaming node comprises repackaging the further data traffic using the address of the second roaming node.

* * * * *